July 15, 1952     H. TILLER ET AL     2,603,127
PROJECTION LENS-SYSTEM CORRECTED FOR SPHERICAL, CHROMATIC,
COMATIC, ASTIGMATIC, AND DISTORTIONAL ABERRATIONS
Filed May 8, 1950
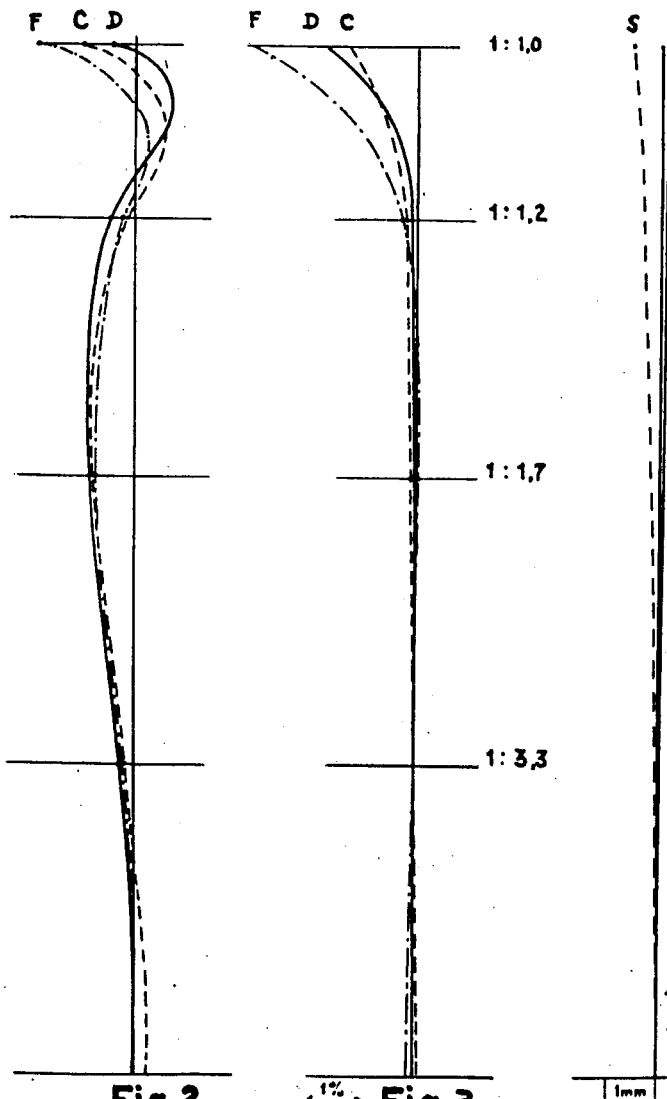

Patented July 15, 1952

2,603,127

UNITED STATES PATENT OFFICE 2,603,127

PROJECTION LENS-SYSTEM CORRECTED FOR SPHERICAL, CHROMATIC, COMATIC, ASTIGMATIC, AND DISTORTIONAL ABERRATIONS

Hans Tiller, Zurich, and Hans Schulz, Grenchen, Switzerland, assignors to Cycloptic Anstalt für Optik und Mechanik, Vaduz, Vaduz, Liechtenstein Application May 8, 1950, Serial No. 160,662
In Switzerland March 8, 1950

4 Claims. (Cl. 88—57)

The projection objectives known hitherto, in spite of the relatively small field angle required for projection purposes, possess a comparatively small aperture and they could not be satisfactorily corrected for larger apertures. The remaining known projection lens-systems also, mostly of the Petzval type, may be corrected, but only up to a limited relative aperture, in spite of the comparatively small field angle required, because, even if modern optical glass is used, with corrected astigmatism the curvature of field can only be eliminated indirectly, and a considerable astigmatic difference between the two image-surfaces must be taken into account.

In projection lens-systems according to the present invention such corrections may be effected even for larger relative apertures; a projection lens-system of this kind is characterized in that it is composed of two air-separated system components both contributing in common to the image correction of the whole system, the front part situated on the screen side comprising at least two lenses and the rear part situated on the object side consisting of a chromatically-corrected triplet-like system, and in that the principal plane on the object side of the front part is at least approximately in the screen side focal plane of the rear part, in such a manner that the front part substantially determines the focusing distance on the object side and the aperture of the whole system and that the rear part substantially determines the focal length of the whole system.

In this case, the principal rays of the object side illuminating ray-bundles entering the rear, object side system in a parallel or approximately parallel direction to the optical axis, owing to the optical arrangement of the object side part of the optical system, are deviated therein from their original direction and towards the optical axis, i. e., in a converging direction, in such a manner that they intersect with the optical axis at least approximately in the principal point of the object side of the image side part of the system, it being possible without unfavourably influencing the correction to keep the diameter of the lenses of the object side part sufficiently large in order to avoid a disturbing aperture decrease towards the edge of the image or the image corners respectively, and thus to produce a full aperture in the corners as well as in the centre of the image.

The result is that, with the described position of the principal plane, directed towards the rear part of the system, and belonging to the front part of this system with respect to the position of the focal plane of the rear part of the system directed towards the front part of this system, particularly favourable conditions are present within certain limits, and that the conditions are fulfilled for correction as well as the conditions for reducing the decrease of the aperture and for obtaining a favourable object side focusing distance, if, according to the invention, the total length of the system is at least 0.7 and at most twice the total focal length, and if the focal length of the object side system part does not differ by more than 20% from the total focal length of the whole system, the focal length of the image side system part being greater than the total focal length of the whole system. Within these limited basic design conditions advantageous embodiments are possible if the object side system part is triplet-like, i. e., comprising at least three air-separated lenses, both, the one oriented towards the object as well as the one remote from the latter, having positive refractive power and including a lens with negative refractive power, and if in addition the screen side part of the system is composed of at least two air-separated members, the member oriented towards the screen having positive refractive power, whereas the second member remote from the screen possessing a focal length the absolute value of which is at least double that of the first member with a positive refractive power, the said second member having the shape of a maniscus in such a manner, that its concave side is directed towards the screen, and if in addition the air space separating the two parts of the complete system exceeds 30% of the total focal length of the system.

The front part, which is nearer to the image, may be composed of three lenses, of which the two outer ones are convergent and the middle one is divergent, and at least two neighbouring lenses may be cemented together.

The convergent lenses of the screen side part of the system may consist of the same glass material.

A projection lens-system constructed according to the described characteristics and differing completely from projection objectives with a relative aperture higher than f:1.5 hitherto known, makes it possible to avoid to a large extent the errors and disadvantages mentioned at the beginning, and to maintain the value of the spherical error within the limit accepted for objective lenses with high relative apertures, without its being necessary to utilize unusual glass types, it being possible to eliminate field curvature and astigmatism, as well as distortion, and extraordinarily high and uniform aperture being maintained over the entire image area.

In the drawings is represented an embodiment, and more particularly:

Fig. 1 shows a section through the lens system,

Fig. 2 shows spherical and chromatic errors,

Fig. 3 shows the deviation against the sine condition,

Fig. 4 shows astigmatic errors.

In Figs. 2 and 3, the full line curves correspond to the spectral line D, the interrupted lines correspond to the spectral line C and the dash-dotted lines correspond to the spectral line F. The full line in Fig. 4 corresponds to the meridional and the interrupted line to the sagittal image surface.

Optical data for the illustrated projection lens-system with an aperture of f:1.0 are given below.

| Radii mm. | Axial distances mm. | Glass type Schott nomenclature |
|---|---|---|
| $r_1 = +\ 90.7$ | | |
| | $d_1 = 21.7$ | BK    8 |
| $r_2 = -240.8$ | | |
| | $l_1 = 14.3$ | |
| $r_3 = -\ 80.83$ | | |
| | $d_2 = 4.1$ | BaSF  1 |
| $r_4 = +169.0$ | | |
| | $d_3 = 23.5$ | BK    8 |
| $r_5 = -\ 84.58$ | | |
| | $l_2 = 45.58$ | |
| $r_6 = +\ 74.6$ | | |
| | $d_4 = 11.16$ | SSK   5 |
| $r_7 = -111.1$ | | |
| | $l_3 = 4.7$ | |
| $r_8 = -\ 71.19$ | | |
| | $d_5 = 14.68$ | SF   10 |
| $r_9 = +\ 71.19$ | | |
| | $l_4 = 7.0$ | |
| $r_{10} = +\ 58.74$ | | |
| | $d_6 = 11.16$ | BaSF  2 |
| $r_{11} = -135.7$ | | |

Total focal length $f = 99.65$ mm.

In the above table, $r$ are the radii of the lenses, $d$–the lens thicknesses, $l$–the air spaces between the lenses; data concerning glass qualities are taken from Schott's glass list.

Additional data:

|  | mm. |
|---|---|
| Focal length of lens 1 | $= +129.6$ |
| Focal length of lenses 2 and 3 | $= -759.9$ |
| Focal length of the front part | $= +172$ |
| Focal length of the rear part | $= +\ 94.92$ |
| Focal length of the total system | $= +\ 99.65$ |
| Focusing distance on the object side | $=\ \ \ 21.27$ |

The sum of the distance between the front and rear part and ⅓ each of the constructional lengths of both parts of the system = 83.01.

Besides, it results from theoretical and experimental research that for obtaining high illuminating apertures with simultaneous excellent image qualities, the free opening filled by the image-forming rays of the lens surface nearest to the object, i. e., nearest to the filmholder frame, should be equal to or larger than the sum of the diagonal of the said filmholder frame and of the product of the focusing distance increased by 2%, multiplied by the difference between 1.6 times the relative aperture of the whole lens system and the square of the latter.

Under the above mentioned conditions it is possible to produce projection lens systems with relative apertures higher than f:1.5. In this case, the rear part of the lens system may consist of three or four simple lenses, two of which may be cemented together, but it is essential that the said rear part be of triplet-like construction or be deduced from the latter, i. e., that it consists of three or even four air-spaced members, and each member may consist of two or more single lenses cemented together.

Since in this case the screen side part of the system substantially determines the relative aperture and thus represents the diaphragm of the projection lens-system, the image of the light source may preferably be focused in that system part or very close to it.

If the light source is focused in the object plane and if the illuminating principal rays follow a telescopic or nearly telescopic path, all points of the object surface including those at the edges or even in the corners of the object surface are projected through the lens system on to the screen with the same high aperture value, very high brightness being obtained also at the screen edges, since the usual vignetting of the hitherto known projection systems is practically eliminated. This makes possible a considerably better light yield than with projection lenses known hitherto, or a reduction and even a complete elimination of brightness decrease towards the image edge, together with the utilization of higher illuminating apertures.

We claim:

1. Projection lens-system corrected for spherical, chromatic, comatic, astigmatic and distortional aberrations, comprising two air separated system components, the front system component situated on the screen side comprising at least two lenses and the rear system component situated on the object side consisting of a chromatically corrected triplet-like system, said system components contributing in common to the image correction of the whole system, the total constructional length of said system being at least 0.7 and at most twice the total focal length and the focal length of the front system component being greater than the focal length of the whole system, the focal length of said rear system component not differing by more than 20% from the focal length of the whole system.

2. Projection lens-system corrected for spherical, chromatic, comatic, astigmatic and distortional aberrations, comprising two air separated system components, the front system component situated on the screen side comprising at least two lenses and the rear system component situated on the object side consisting of a chromatically corrected triplet-like system, said system components contributing in common to the image correction of the whole system, said rear system component, comprising at least three air separated members, two of which have positive refractive power and having said third member with negative refractive power arranged between them, the focal length of said rear part not differing by more than 20% from the focal length of the whole system.

3. Projection lens-system corrected for spherical, chromatic, comatic, astigmatic and distortional aberrations, comprising two air separated system components, the front system component being composed of two air separated members, the member oriented toward the rear part of the system having the shape of a meniscus, the concave side of said meniscus being oriented toward the screen, the absolute value of the focal length of said meniscus being at least double that of the first member with positive refractive power, the air space separating the two system components exceeding 30% of the total focal length of said system, the focal length of said rear system component not differing by more than 20% from the focal length of said whole system.

4. Projection lens-system corrected for spherical, chromatic, comatic, astigmatic and distortional aberrations, comprising two air separated system components, the front system component situated on the screen side, comprising at least two lenses and the rear part system component, situated on the object side consisting of a chromatically-corrected triplet-like system, the focal length of said rear system component not differing by more than 20% from the sum of the distance between the front and rear system components and one-third each of the constructional length of the two system components, both system components contributing in common to the image correction of the whole system, the focal length of said rear part not differing by more than 20% from the focal length of the whole system.

HANS TILLER.
HANS SCHULZ.

REFERENCES CITED

The following references are of record in the file of this patent:

UNITED STATES PATENTS

| Number | Name | Date |
|---|---|---|
| 1,610,514 | Graf | Dec. 14, 1926 |
| 1,797,202 | Warmisham | Mar. 17, 1931 |
| 2,502,544 | Warmisham | Apr. 4, 1950 |

FOREIGN PATENTS

| Number | Country | Date |
|---|---|---|
| 444,350 | Great Britain | Mar. 19, 1936 |
| 550,870 | Great Britain | Jan. 28, 1943 |
| 561,597 | Great Britain | May 25, 1944 |